United States Patent
Sinisi et al.

(10) Patent No.: US 12,351,160 B1
(45) Date of Patent: Jul. 8, 2025

(54) HYBRID POWERTRAIN MOTOR TORQUE CONTROL DURING OVERRUNNING TRANSMISSION

(71) Applicant: FORD GLOBAL TECHNOLOGIES, LLC, Dearborn, MI (US)

(72) Inventors: Zachary John Sinisi, Royal Oak, MI (US); Corey James Blue, Belleville, MI (US); Sassan Farahmand, Canton, MI (US); Justin Panhans, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/822,594

(22) Filed: Sep. 3, 2024

(51) Int. Cl.
| | |
|---|---|
| *B60W 10/08* | (2006.01) |
| *B60W 10/06* | (2006.01) |
| *B60W 20/10* | (2016.01) |
| *B60W 20/40* | (2016.01) |
| *B60W 20/13* | (2016.01) |

(52) U.S. Cl.
CPC ............ *B60W 20/40* (2013.01); *B60W 10/06* (2013.01); *B60W 10/08* (2013.01); *B60W 20/10* (2013.01); *B60W 20/13* (2016.01); *B60W 2510/0208* (2013.01); *B60W 2510/0241* (2013.01); *B60W 2510/0676* (2013.01); *B60W 2510/1015* (2013.01); *B60W 2510/104* (2013.01); *B60W 2540/10* (2013.01); *B60W 2710/083* (2013.01)

(58) Field of Classification Search
CPC ...... B60W 10/06; B60W 10/08; B60W 20/10; B60W 20/13; B60W 20/40; B60W 2510/0208; B60W 2710/083; B60W 2510/0657; B60W 2510/0676; B60W 2510/1015; B60W 2510/104; B60W 2540/10; B60W 2510/10
USPC ................................ 701/54, 53, 22; 477/3, 5
See application file for complete search history.

(56) References Cited

U.S. PATENT DOCUMENTS

| | | | |
|---|---|---|---|
| 9,440,654 B2 | 9/2016 | Atluri et al. | |
| 9,932,914 B2 | 4/2018 | Mansour et al. | |
| 10,183,566 B2 | 1/2019 | Trent | |
| 2015/0175156 A1* | 6/2015 | Kwon | B60W 20/50 180/65.265 |
| 2016/0059847 A1* | 3/2016 | Thompson | B60W 10/08 180/65.265 |

(Continued)

*Primary Examiner* — Roger L Pang
(74) *Attorney, Agent, or Firm* — Vincent Mastrogiacomo; Brooks Kushman P.C.

(57) ABSTRACT

A hybrid vehicle includes an engine, an electric machine, a disconnect clutch configured to selectively couple the engine to the electric machine, a transmission having an input shaft operably coupled to the electric machine and an output shaft operably coupled to a driveline, and a controller programmed to, in response to (i) the disconnect clutch being disengaged and (ii) a speed difference between the input and output shafts being less than a threshold, limit torque commanded to the electric machine to a value that is less than a rated torque of the electric machine regardless of driver-demand torque, and further programmed to, in response to (i) the disconnect clutch being disengaged, (ii) a request to start the engine, and (iii) the speed difference exceeding the threshold, permit a torque command to the electric machine that exceeds the value to reduce the speed difference between the input and output shafts.

20 Claims, 2 Drawing Sheets

(56) References Cited

U.S. PATENT DOCUMENTS

2021/0078578 A1\* 3/2021 Meyer .................... B60K 6/547
2022/0105793 A1 4/2022 Sukhatankar et al.

\* cited by examiner

HYBRID POWERTRAIN MOTOR TORQUE CONTROL DURING OVERRUNNING TRANSMISSION

TECHNICAL FIELD

This disclosure relates to hybrid vehicles having an engine and an electric machine and more particularly to controlling motor torque.

BACKGROUND

A hybrid-electric vehicle includes a traction battery constructed of multiple battery cells in series and/or parallel. The traction battery provides power for vehicle propulsion and accessory features. During operation, the traction battery may be charged or discharged based on the operating conditions including a battery state of charge, driver demand, and regenerative braking. The battery powers an electric machine that provides propulsion torque in conjunction with an internal combustion engine.

SUMMARY

According to one embodiment, a hybrid vehicle includes an engine, an electric machine, a disconnect clutch configured to selectively couple the engine to the electric machine, and a transmission having an input shaft operably coupled to the electric machine and an output shaft operably coupled to a driveline. The vehicle further includes a controller programmed to, in response to (i) the disconnect clutch being disengaged and (ii) a speed difference between the input and output shafts being less than a threshold, limit torque commanded to the electric machine to a value that is less than a rated torque of the electric machine regardless of driver-demand torque. The controller is further programmed to, in response to (i) the disconnect clutch being disengaged, (ii) a request to start the engine, and (iii) the speed difference exceeding the threshold, permit a torque command to the electric machine that exceeds the value to reduce the speed difference between the input and output shafts.

According to another embodiment, a hybrid vehicle includes an engine, an electric machine, a disconnect clutch configured to selectively couple the engine to the electric machine, and a transmission having an input shaft operably coupled to the electric machine and an output shaft operably coupled to a driveline. A vehicle controller programmed to: in response to (i) the disconnect clutch being disengaged, (ii) a speed difference between the input and output shafts being less than a threshold, and (iii) a driver-demanded torque exceeding a buffer-limit torque of the electric machine, command the buffer-limit torque to the electric machine, and, in response to (i) the disconnect clutch being disengaged, (ii) the speed difference exceeding the threshold, and (iii) the driver-demanded torque exceeding the buffer-limit torque, command a torque to the electric machine that is greater than the buffer-limit torque to reduce the speed difference between the input and output shafts.

According to yet another embodiment, a method of operating a hybrid powertrain including an engine, an electric machine selectively coupled to the engine by a disconnect clutch, and a transmission includes: in response to (i) the disconnect clutch being disengaged and (ii) a speed difference between input and output shafts of the transmission being less than a threshold, limiting torque commanded to the electric machine to a value that is less than a rated torque of the electric machine regardless of driver-demand torque, and, in response to (i) the disconnect clutch being disengaged, (ii) a request to start the engine, and (iii) the speed difference exceeding the threshold, permitting a torque command to the electric machine that exceeds the value to reduce the speed difference between the input and output shafts.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
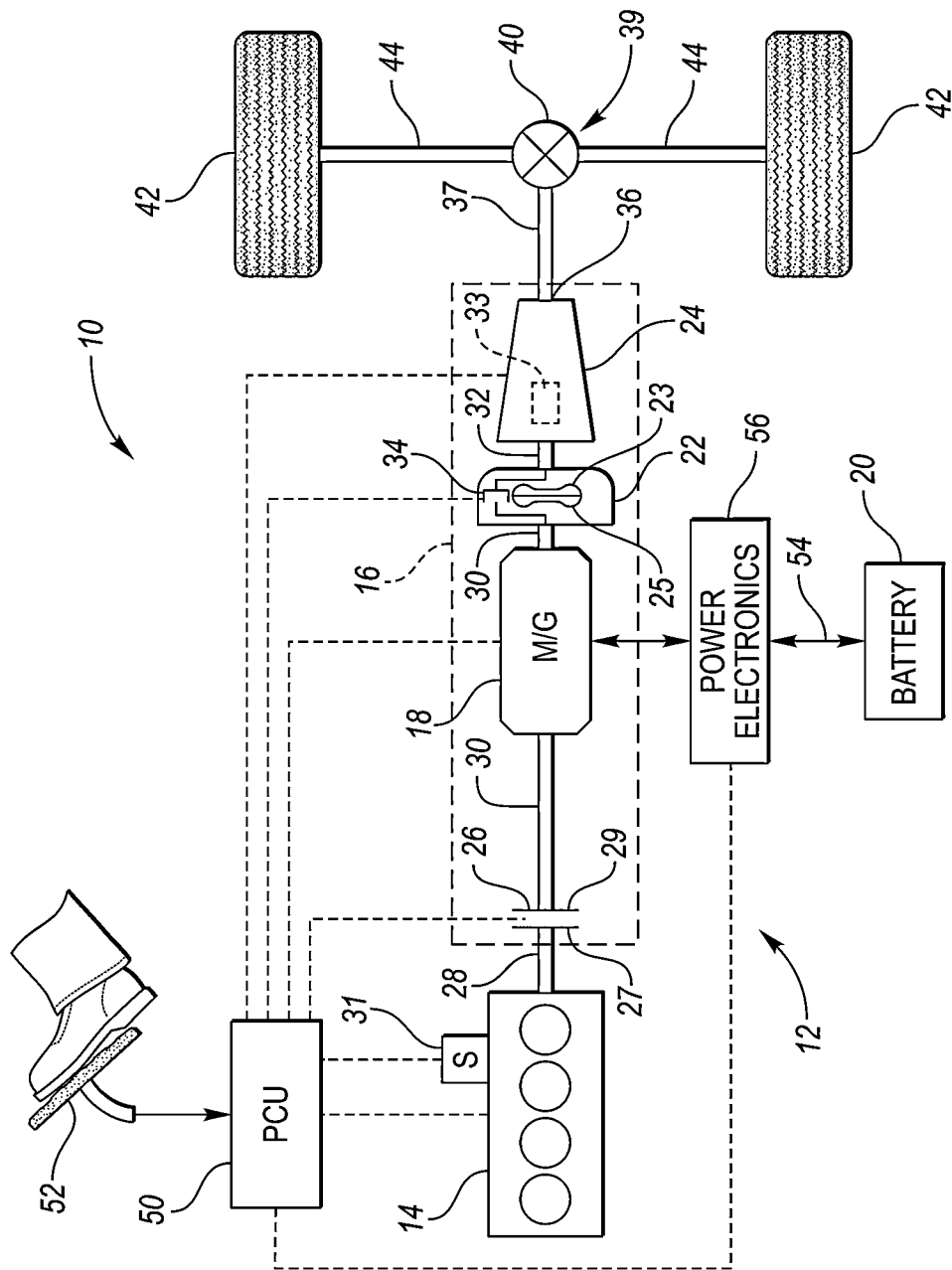
FIG. 1 is a schematic of a hybrid electric vehicle according to one embodiment.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The disconnect clutch 26 includes a first component 27 rotationally fixed relative to the engine and a second component 29 rotationally fixed relative to the M/G 18. The M/G 18 may be implemented by any one of a plurality of types of electric machines. For example, the M/G 18 may be a permanent magnet synchronous motor. Power electronics condition direct current (DC) power provided by the battery 20 to the requirements of the M/G 18, as described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine 14 is started, the starter motor 31 can be disengaged from the engine 14 via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine 14 disconnected with the M/G 18. Once the engine 14 has started and is brought up to speed with the M/G 18, the disconnect clutch 26 can couple the engine 14 to the M/G 18 to allow the engine 14 to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 25 fixed to a transmission input shaft 32. The torque converter 22 provides a hydraulic coupling between shaft 30 and transmission input shaft 32. The torque converter 22 transmits power from the impeller 23 to the turbine 25 when the impeller 23 rotates faster than the turbine 25. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller 23 and the turbine 25 of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be an torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. This type of gearbox may be referred to as a "step-ratio gearbox." For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The output shaft 36 is coupled with a driveshaft 37 of the driveline 39.

The gearbox 24 may have six speeds including first through sixth gears. (Six speeds is merely an example and the gearbox 24 may include seven, eight, nine, or ten speeds in other example embodiments.) In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36. The gearbox 24 may include types of friction elements such as wet clutches that include plates and disc that are compressed/decompressed to engage and disengage the clutch. The gearbox may also include one or more one-way clutches 33 as one or more of the friction elements used to create a power flow path (i.e., one of the gears) from the transmission input shaft 32 to the transmission output shaft 36. That is, the one-way clutch is associated with at least a first speed ratio of the transmission.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40 by the driveshaft 37. The differential 40 drives a pair of wheels 42 via respective axles 44 connected to the differential 40. The differential 40 transmits approximately equal torque to each wheel 42 while permitting slight speed differences such as when the vehicle 10 turns a corner. Different types of differentials or similar devices may be used to distribute torque from the powertrain to one or more wheels. In some applications, torque distribution may vary depending on the particular operating mode or condition, for example.

The powertrain 12 further includes one or more controllers 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller"

that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 50 in controlling the vehicle 10.

The controller 50 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller 50 include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle 10 to provide a demanded torque, power, or drive command to propel the vehicle 10. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal 52, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller 23 and the turbine 25. Alternatively, the torque converter bypass clutch 34 may be operated as locked or open without using a modulated operating mode depending on the particular application.

To drive the vehicle 10 with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The traction battery 20 may be constructed from a variety of chemical formulations. Typical battery pack chemistries may be lead acid, nickel-metal hydride (NIMH) or Lithium-Ion. A battery management system may have a one or more controllers, such as a Battery Energy Control Module (BECM) that monitors and controls the performance of the traction battery. The BECM may include sensors and circuitry to monitor several battery pack level characteristics such as pack current, pack voltage and pack temperature. The BECM may have non-volatile memory such that data may be retained when the BECM is in an off condition. Retained data may be available upon the next key cycle.

In addition to the pack level characteristics, there may be battery cell level characteristics that are measured and monitored. For example, the terminal voltage, current, and temperature of each cell may be measured. The battery management system may use a sensor module to measure the battery cell characteristics. Depending on the capabilities, the sensor module may include sensors and circuitry to measure the characteristics of one or multiple of the battery cells. The battery management system may utilize sensor modules or Battery Monitor Integrated Circuits (BMIC) to measure the characteristics of all the battery cells. Each sensor module may transfer the measurements to the BECM for further processing and coordination. The sensor module may transfer signals in analog or digital form to the BECM. In some embodiments, the sensor module functionality may be incorporated internally to the BECM. That is, the sensor module hardware may be integrated as part of the circuitry in the BECM and the BECM may handle the processing of raw signals. The BECM may include circuitry to interface with the one or more contactors. The positive and negative terminals of the traction battery 20 may be protected by contactors.

Battery state of charge (SOC) gives an indication of how much charge remains in the battery cells or the battery pack 20. The battery pack SOC may be output to inform the driver of how much charge remains in the battery pack 20, similar to a fuel gauge. The battery pack SOC may also be used to control the operation of an electric or hybrid-electric vehicle 10. Calculation of battery pack SOC can be accomplished by a variety of methods. One possible method of calculating battery SOC is to perform an integration of the battery pack current over time. This is well-known in the art as ampere-hour integration.

Battery SOC may also be derived from a model-based estimation. The model-based estimation may utilize cell voltage measurements, the pack current measurement, and the cell and pack temperature measurements to provide the SOC estimate, which may also be referred to as calculated SOC or actual SOC.

The BECM may have power available at all times. The BECM may include a wake-up timer so that a wake-up may be scheduled at any time. The wake-up timer may wake up the BECM so that predetermined functions may be executed. The BECM may include non-volatile memory so that data may be stored when the BECM is powered off or loses power. The non-volatile memory may include Electrical Eraseable Programmable Read Only Memory (EEPROM) or Non-Volatile Random Access Memory (NVRAM). The non-volatile memory may include FLASH memory of a microcontroller.

As discussed above, the engine 14 may be started using the M/G 18. In order to start the engine 14 with the electric machine, the traction battery 20 must have sufficient SOC to produce the torque necessary to crank the engine 14. The controller 50 may be programmed to have a reserve capacity (sometimes referred to as a "start buffer") of the battery SOC (and corresponding a reserve of M/G torque) to ensure the engine 14 may be started using the M/G 18. This buffer limits the amount of torque the electric machine delivers to the wheels prior to starting of the engine thus ensuring that the disconnect clutch can be applied without creating a torque hole.

For example, during a downshift event of the gearbox when the one-way clutch 33 is utilized, the transmission can overrun with the output shaft 36 rotating faster than the input shaft 30. In this state, the input shaft 30 is not rotating fast enough to provide positive torque to the output shaft 36; thus, the transmission is essentially in neutral, i.e., the input shaft 30 is isolated from the output shaft 36 of the transmission.

The controller 50 synchronizes the speeds of the input/output shafts 30, 36 by accelerating the input shaft 30 with torque from the M/G 18. The synchronization time is dependent on the acceleration of the input shaft 30, which in turn is dependent upon the torque output by the M/G 18. Therefore, the synchronization time can be reduced by commanding a higher torque from the M/G 18. However, the above-described torque buffer, which is used to reserve battery state of charge (and corresponding M/G torque), limits the torque output of the M/G 18 below its full capacity, which can prolong the synchronization of the transmission input and output shafts 30/36. In order solve this problem, the controller 50 is programmed to inhibit the start buffer in select instances, such as the one described above, allowing the M/G 18 to provide maximum torque resulting in higher acceleration of the input shaft 30 and faster synchronization of the transmission shafts.

As will be explained below in more detail with reference to the flow chart of FIG. 2, the controller 50 may be programmed to suspend the start buffer of the M/G 18 in response to (i) the disconnect clutch being disengaged, (ii) a request to start the engine, and (iii) the speed difference between the input and output shafts exceeding the threshold. By suspending the buffer, the synchronization time for the transmission is reduced as discussed above. The controller

50 may also be programmed to keep and adhere to the start buffer in response to (i) the disconnect clutch being disengaged and (ii) a speed difference between the input and output shafts being less than a threshold, i.e., when the transmission does not require substantial synchronization. The start buffer may be maintained by limiting the torque produced by the M/G 18 and, when suspended, may be depleted by commanding the M/G 18 to produce its full torque, i.e., the maximum amount of torque the M/G 18 can produce, which may be based on the design of the electric machine as well as limits imposed by the power electronics, the traction battery, and the like.

Figure 2:
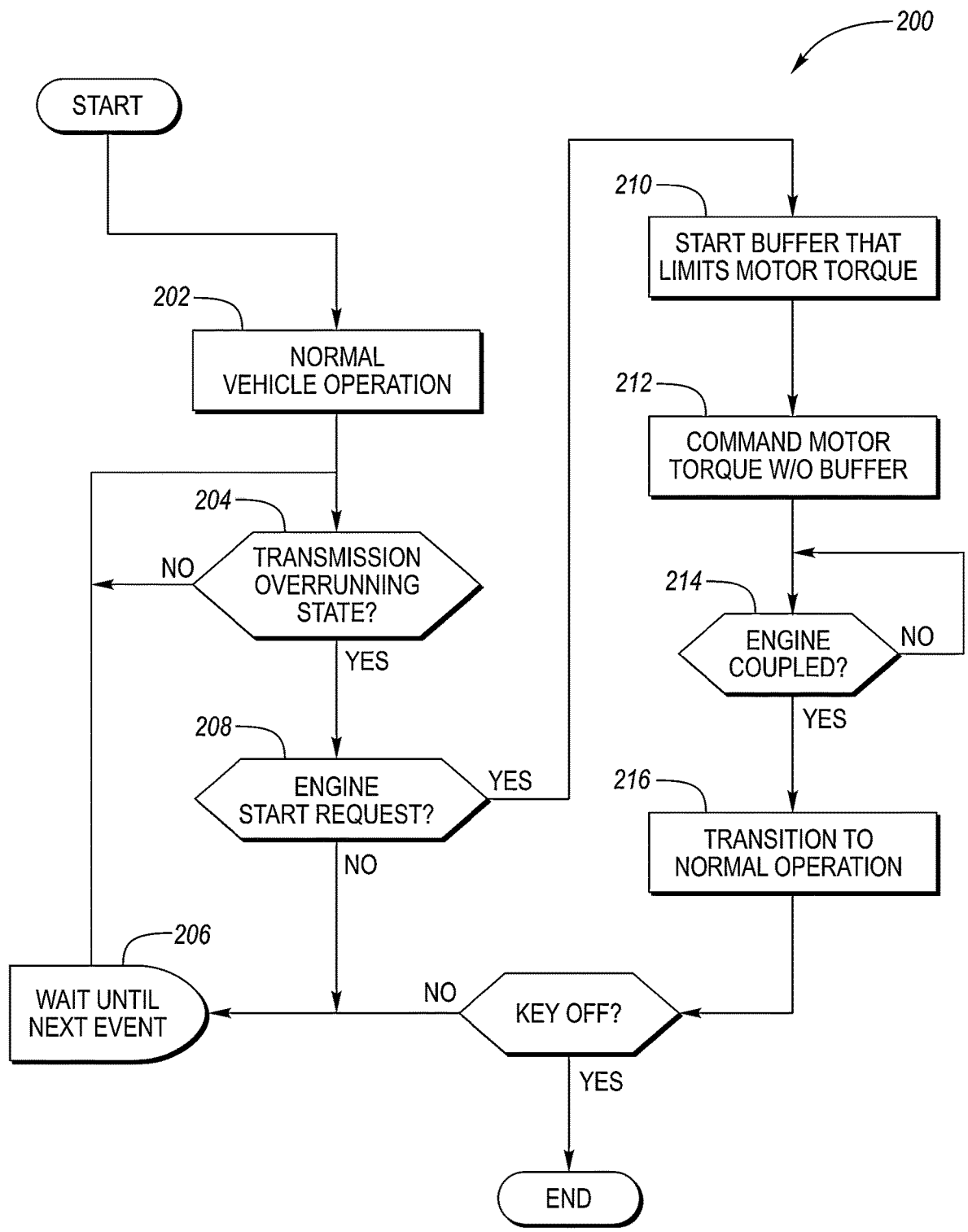
FIG. 2 is a flow chart of an algorithm for controlling a hybrid powertrain.

FIG. 2 illustrates an algorithm 200 for controlling the hybrid powertrain when the transmission is in an overrunning state and starting of the engine has been requested. The controls 200 initiate following a key ON event. As shown in operation 202, the vehicle initially enters a baseline or normal operation in which the above-described start buffer is in place. In operation 204, the controller determines if the transmission is in an overrunning state, i.e., the transmission output shaft is rotating faster than the transmission input shaft by more than a threshold, such as 5, 10, 25, 50, 100, or 200 RPMs. If the speed difference between the transmission shafts is less than the threshold, control passes to 206 and the start buffer remains in place. That is, during the normal operation of the vehicle, the controller is programmed to, in response to (i) the disconnect clutch being disengaged and (ii) a speed difference between the input and output shafts being less than a threshold, limit torque commanded to the electric machine to a value that is less than a rated torque of the electric machine regardless of the driver-demand torque to maintain the start buffer. This value may be referred to as the "buffer-limit torque," which is the maximum amount of torque the electric machine is allowed to produce when the start buffer is in place. The buffer-limit torque is less than the rated torque of the electric machine and is an artificial limit imposed for the purposes of maintaining a reserve in the battery SOC to ensure sufficient M/G torque to start the engine without torque hole. As discussed above, the buffer-limit torque may be based on a variety of factors including the battery state of charge, the conditions of the power electronics, the torque required to crank the engine, engine temperature, and the like. In some embodiments, the controller may also consider if a downshift of the transmission is being request when deciding whether or not to remove the start buffer. Here, the controller may further consider if the downshift is to a gear that includes a one-way clutch as part of the power flow path.

If on the other hand, the transmission is overrunning and an engine start request has been received at operation 208, control passes to operation 210, where the start buffer is removed or suspended. As discussed above, removing the start buffer allows the electric machine to produce more torque than in the normal controls to further accelerate the transmission input shaft and reduce the synchronization time with the output shaft.

At operation 212, the controller commands a torque value to the electric machine without regard for the start buffer. This may result in the value being higher than it otherwise would be if the start buffer were in place. The magnitude of the value may depend on the driver-demanded torque, the speed difference between the input and output shafts of the transmission, and the battery SOC. Generally, the greater the speed difference between the input and output shafts, the greater the value commanded to the electric machine. In some instances, the value may be the maximum torque (sometimes referred to as the rated torque) of the electric machine (as defined by the calibration tables stored in memory associated with the controller). In one or more embodiments, the controller is programmed to, in response to (i) the disconnect clutch being disengaged, (ii) a request to start the engine, and (iii) the speed difference between the input and output shafts exceeding the threshold, permit a torque command to the electric machine that exceeds the buffer-limit torque to reduce the speed difference between the input and output shafts quickly.

At operation 214, the controller determines if the engine is coupled. The controller may determine that the engine is coupled by monitoring the engagement state of the disconnect clutch. For example, the controller may compare a measured or estimated clutch capacity to a threshold. Alternatively, the controller may compare a speed of the engine to a speed of the electric machine, and if the speed difference is less than a threshold, declare the engine coupled. Operation 214 may also consider the combustion status of the engine to determine that the engine has been successfully started and is producing meaningful torque and/or a speed of the engine exceeding a threshold.

Once the engine is coupled, control passes to operation 216 and the controller transitions back to the normal operation in which the start buffer is in place once more. The start buffer will remain in place until conditions dictate that it should be removed, e.g., overrunning of the transmission.

The above-describe control strategy improves powertrain responsiveness, such as during rolling stop events with an engine start request and a transmission downshift, by selectively removing the start buffer unlocking torque potential of the electric machine to quickly increase transmission input shaft speed and reestablish a torque flow path through the transmission.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
   an engine;
   an electric machine;
   a disconnect clutch configured to selectively couple the engine to the electric machine;
   a transmission having an input shaft operably coupled to the electric machine and an output shaft operably coupled to a driveline; and
   a controller programmed to:

in response to (i) the disconnect clutch being disengaged and (ii) a speed difference between the input and output shafts being less than a threshold, limit torque commanded to the electric machine to a value that is less than a rated torque of the electric machine regardless of driver-demand torque, and in response to (i) the disconnect clutch being disengaged, (ii) a request to start the engine, and (iii) the speed difference exceeding the threshold, permit a torque command to the electric machine that exceeds the value to reduce the speed difference between the input and output shafts.

2. The hybrid vehicle of claim 1, wherein the controller permits the torque command to the electric machine to exceed the value further in response to a request to downshift of the transmission.

3. The hybrid vehicle of claim 1, wherein the controller permits the torque command to the electric machine to exceed the value until a speed of the engine exceeds a speed threshold.

4. The hybrid vehicle of claim 1, wherein the controller permits the torque command to the electric machine to exceed the value until a capacity of the disconnect clutch exceeds a capacity threshold.

5. The hybrid vehicle of claim 1, wherein the transmission includes a step-ratio gearbox having a one-way clutch associated with at least a first speed ratio of the transmission, and wherein the controller permits the torque command to the electric machine to exceed the value further in response to a request to downshift the transmission to the first speed ratio.

6. The hybrid vehicle of claim 1, wherein the value is based on a cranking torque of the engine.

7. The hybrid vehicle of claim 1, wherein the value is further based on a temperature of the engine.

8. The hybrid vehicle of claim 1, wherein the disconnect clutch includes a first component fixed to the engine and a second component fixed to the electric machine.

9. The hybrid vehicle of claim 1 further comprising a torque converter having an impeller fixed to the electric machine and a turbine fixed to the input shaft of the transmission.

10. A hybrid vehicle comprising;
an engine;
an electric machine;
a disconnect clutch configured to selectively couple the engine to the electric machine;
a transmission having an input shaft operably coupled to the electric machine and an output shaft operably coupled to a driveline; and
a controller programmed to:
in response to (i) the disconnect clutch being disengaged, (ii) a speed difference between the input and output shafts being less than a threshold, and (iii) a driver-demanded torque exceeding a buffer-limit torque of the electric machine, command the buffer-limit torque to the electric machine, and in response to (i) the disconnect clutch being disengaged, (ii) the speed difference exceeding the threshold, and (iii) the driver-demanded torque exceeding the buffer-limit torque, command a torque to the electric machine that is greater than the buffer-limit torque to reduce the speed difference between the input and output shafts.

11. The hybrid vehicle of claim 10, wherein the controller commands the torque to the electric machine until a speed of the engine exceeds a speed threshold.

12. The hybrid vehicle of claim 10, wherein the controller commands the torque to the electric machine until a capacity of the disconnect clutch exceeds a capacity threshold.

13. The hybrid vehicle of claim 10, wherein the transmission includes a step-ratio gearbox having a one-way clutch associated with at least a first speed ratio of the transmission, and wherein the controller commands the torque to the electric machine further in response to a request to downshift the transmission to the first speed ratio.

14. The hybrid vehicle of claim 10, wherein the buffer-limit torque is based on a cranking torque of the engine.

15. The hybrid vehicle of claim 10, wherein the buffer-limit torque is further based on a temperature of the engine.

16. The hybrid vehicle of claim 10, wherein the disconnect clutch includes a first side fixed to the engine and a second side fixed to the electric machine.

17. The hybrid vehicle of claim 10, wherein a value of the torque is based on the speed difference.

18. A method of operating a hybrid powertrain including an engine, an electric machine selectively coupled to the engine by a disconnect clutch, and a transmission, the method comprising:
in response to (i) the disconnect clutch being disengaged and (ii) a speed difference between input and output shafts of the transmission being less than a threshold, limiting torque commanded to the electric machine to a value that is less than a rated torque of the electric machine regardless of driver-demand torque, and in response to (i) the disconnect clutch being disengaged, (ii) a request to start the engine, and (iii) the speed difference exceeding the threshold, permitting a torque command to the electric machine that exceeds the value to reduce the speed difference between the input and output shafts.

19. The method of claim 18, wherein the permitting is further in response to a request to downshift the transmission.

20. The method of claim 18, wherein the value is based on a cranking torque of the engine.

* * * * *